United States Patent [19]

St. Clair et al.

[11] 4,431,792

[45] Feb. 14, 1984

[54] THERMOSET-THERMOPLASTIC AROMATIC POLYAMIDE CONTAINING N-PROPARGYL GROUPS

[75] Inventors: Terry L. St. Clair, Poquoson; James F. Wolfe, Blacksburg, both of Va.; Thomas D. Greenwood, Bristol, Tenn.

[73] Assignee: The United States of America as represented by the Administrator of the National Aeronautics and Space Administration, Washington, D.C.

[21] Appl. No.: 447,371

[22] Filed: Dec. 7, 1982

Related U.S. Application Data

[62] Division of Ser. No. 199,768, Oct. 23, 1980, Pat. No. 4,395,540.

[51] Int. Cl.$^3$ ............................................. C08G 69/32
[52] U.S. Cl. ................................... 528/183; 525/426; 528/220; 528/345; 528/348
[58] Field of Search ................ 528/345, 183, 220, 348

[56] References Cited

U.S. PATENT DOCUMENTS 4,097,456 6/1978 Barie .................................. 525/426

Primary Examiner—Harold D. Anderson
Attorney, Agent, or Firm—Howard J. Osborn; John R. Manning; Wallace J. Nelson

[57] ABSTRACT

The compounds are of the class of aromatic polyamides useful as matrix resins in the manufacture of composites or laminate fabrication. The process for preparing this thermoplastic-thermoset polyamide system involves incorporating a latent crosslinking moiety along the backbone of the polyamide to improve the temperature range of fabrication thereof wherein the resin softens at a relatively low temperature ($\simeq$154° C.) and subsequently "sets-up" or undergoes crosslinking when subjected to higher temperature ($\simeq$280° C.).

4 Claims, No Drawings

THERMOSET-THERMOPLASTIC AROMATIC POLYAMIDE CONTAINING N-PROPARGYL GROUPS

ORIGIN OF THE INVENTION

The invention described herein was made jointly by an employee of the U.S. Government and under a NASA contract and is subject to the provisions of Section 305 of the National Aeronautics and Space Act of 1958, Public Law 85-568 (72 Stat. 435; USC 2457).

This is a division of application Ser. No. 199,768 filed Oct. 23, 1980, now U.S. Pat. No. 4,395,540.

BACKGROUND OF THE INVENTION

The use of thermoplastics such as polyamides as matrix resins for use in composite or laminate fabrication has one major drawback, they must be processed at and have a heat distortion temperature (HDT) of at least 50° C. above the temperature at which they are to be used so that their modulus of stiffness properties will be acceptable. This problem becomes compounded when an organic fiber is to be used as the reinforcing agent with such a polymer because the fiber also has a characteristic temperature at which it begins to irreversibly lost its stiffness properties. This is generally due to a relaxation phenomenon occurring in a highly oriented fiber.

The case in point is where the fiber to be utilized (of the aromatic polyamide class) in a structural composite application has a relaxation that occurs slightly below 300° C. In order to fabricate a structural laminate with this fiber reinforcement a temperature of 280° C. should not be exceeded in order to assure maximum fiber modulus. This thermal restriction must now in turn be imposed in the resin or polymer meaning it should be processable at a temperature lower than 280° C.

Attempts to develop a polymer which would be thermally and chemically compatible with the fiber led to the development of an aromatic secondary polyamide of the following recurring structure:

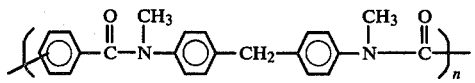

This polymer had the necessary property of a low HDT (154° C.), but the problem still existed of not being able to utilize the full thermal potential of the fiber (300° C.) because the polymer would soften at the lower temperature. The heating of this polymer to temperatures approaching the relaxation temperature of the fiber had no effect on the polymer's HDT.

There is thus a definite need in the art for an aromatic or aliphatic polyamide resin that can be cured in the region of 300° C. and have a HDT no more than 50°-70° C. below this temperature.

Accordingly, an object of the present invention is to develop a polyamide which can be processed at or below 300° C. due to a low HDT and then subsequently attain a higher HDT due to a chemical conversion which occurs during the thermal treatment.

Another object of the present invention is a novel polyamide which can be utilized for fabricating structural composites.

Another object of the present invention is a novel polyamide or series of polyamides which can be utilized as thermoset-thermoplastics due to a latent chemical conversion.

Another object of the present invention is a novel process of preparing a thermoset-thermoplastic molding material.

Another object of the present invention is a novel process for fabricating a structural composite which is a solvent resistant.

Another object of the present invention is a novel process for fabricating structure composites.

Another object of the present invention is a novel polymer which is soluble before thermal processing, but solvent resistant after this processing.

SUMMARY OF THE INVENTION

According to the present invention, the foregoing and other objects are attained by incorporating a latent crosslinking moiety at various levels along the backbone of an aromatic polyamide in order to produce a polymer of high molecular weight which will soften to allow processing at a relatively low temperature (154° C.) and subsequently "set-up" when treated at a higher temperature (280° C.). This type system may be referred to as a thermoplastic-thermoset resin since it initially behaves like a conventional thermoplastic and subsequently set-up through latent crosslinking sites.

These sites of latent crosslinking form the basis for the present invention. These sites were necessitated by processing restrictions not to enter into any chemical reactions during the fabrication of the thermoplastic component, and then, on heating to a more elevated temperature to form crosslinks which in turn results in a polymer system with an increased HDT and also increased resistance to solvents.

DETAILED DESCRIPTION OF THE INVENTION

The structure of the novel system of the present invention is:

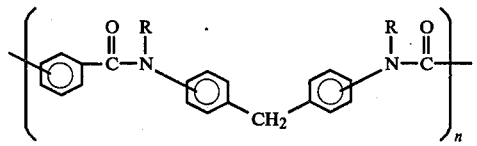

n = several hundred repeat units
where R in a given unit is —CH$_3$ and —CH$_2$—C≡CH in varying ratios from where —CH$_3$ is 99% and —CH$_2$C≡CH is 1% to where —CH$_3$ is 0% and —CH$_2$C≡CH is 100%.

In the above structure it is the —CH$_2$C≡CH or propargyl group that is the latent crosslinking agent which increases the polymers HDT and solvent resistance. Table I illustrates the polymers HDT change as the propargyl group is increased for the following polymer

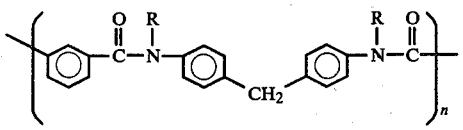

TABLE I

| R | HDT, after treatment to 280° C. for 15 min., °C. |
|---|---|
| (1) 100% —CH$_3$, 0% —CH$_2$—C≡CH | (Control Composition) 165 |
| (2) 99% —CH$_3$, 1% —CH$_2$—C≡CH | 171 |
| (3) 95% —CH$_3$, 5% —CH$_2$—C≡CH | 193 |
| (4) 90% —CH$_3$, 10% —CH$_2$—C≡CH | 200 |
| (5) 67% —CH$_3$, 33% —CH$_2$—C≡CH | 206 |

The improvement in solvent resistance was proven by immersing the polyamide (1) which contained no propargyl and (4) which contained 10% propargyl into various solvents after treating to 280° C. for 15 minutes. The results were as follows:

TABLE II

| | Percent Propargyl in Polymer | |
|---|---|---|
| Solvent | 0% | 10% |
| Chloroform | Soluble | Swelling of polymer only |
| Cresol Mixture | Soluble | Swelling of polymer only |

The reaction of the propargyl group was monitored by infrared spectroscopy by following the disappearance of the ≡C—H absorption at 3.1 microns (wavelength) or 3025 cm$^{-1}$ (frequency). The exotherms for the reaction of the propargyl were also monitored by differential scanning calorimetry (DSC). The exotherm in the DSC spectrum for propargyl occurred between 200°-350° C. generally centering at approximately 300° C. (maximum rate of reaction).

The polyamides were all prepared by a conventional method where an aromatic diacid chloride of the general formula

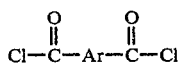

where Ar is selected from

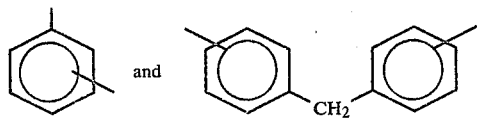

is allowed to react with a bis-secondary aromatic diamine of the general formula

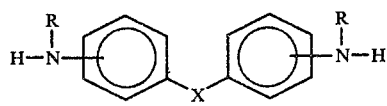

where X is selected from

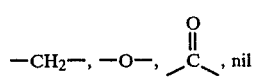

and R is selected from —CH$_3$ and —CH$_2$C≡CH in a solvent such as sym tetrachloroethane.

Thus, when Ar is

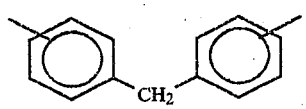

the resulting polyamide in the above process would be represented by repeating units of the formula:

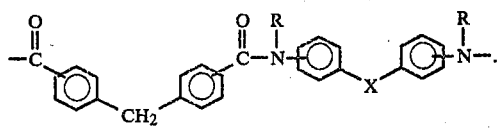

Similarly, when Ar is

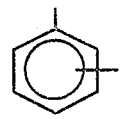

the resulting polyamide would be represented by repeating units of the formula:

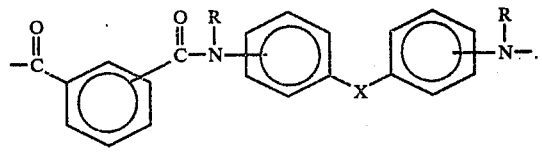

The propargyl containing aromatic diamines were prepared by the N,N'-dialkylation of primary aromatic diamines.

EXPERIMENTAL DETAILS

Preparation of p,p'-Bis(trifluoroacetamido)diphenylmethane

Trifluoroacetic anyhydride (105.0 g, 0.50 mol) was slowly added to 40.0 g (0.20 mol) of p,p'-diaminodiphenylmethane in 300 ml of tetrahydrofuran. The reaction mixture was refluxed 1.5 hours, then the solvent was stripped by rotary evaporation. The crude tan solid was recrystallized from chloroform/methanol to yield 77.32 g (99% yield) of the desired product, mp 229°-230° C.

Preparation of N,N'-Bispropargyl-p,p'-bis(trifluoroacetamido)diphenylmethane To 3.7 g (0.154 mol) of sodium hydride in 20 ml of N,N'-dimethylformamide was added 20.0 g (0.0513 mol) of the trifluoroacetomide from the previous reaction. The resulting yellow dianion solution was filtered through a glass frit and 24.41 g (0.205 mol) of propargyl bromide was added. The reaction mixture was allowed to stir at room temperature for eight hours. The reaction mixture was poured into 1 N HCl and the resulting oil was extracted with ethyl acetate, dried with MgSO$_4$, and concentrated. Flash chromatography gave 20.08 g (84% yield) of the desired product, mp 153°-155° C.

Preparation of N,N'-Bispropargyl-p,p'-diaminodiphenylmethane

Powdered potassium hydroxide (0.93 g, 0.0166 mol) was added to a slurry of 1.94 g (0.004 mol) of N,N'-bispropargyl-p,p'-bis(trifluoroacetamido)diphenylmethane in 100 ml of 95% ethanol. This solution was stirred at room temperature for one hour, then poured into cold water causing the crude product to precipitate. This material was recrystallized from 95% ethanol to give 1.05 g (92% yield) of the bispropargyl compound, mp 107°–108° C.

Typical Procedure for Polymerizing a Bisproparyldiamine with a Diacid Chloride Appropriate molar portions (0.02 mol total) of diamines were weighed into a 50 ml resin kettle and dissolved in 20–25 ml of dry CHCl$_3$ (distilled from CaH$_2$ after initial washing with H$_2$O to remove EtOH$^3$ stabilizer). Dry, powdered Ca (0.08 mol) was then added, and the reaction mixture stirred to achieve a homogeneous slurry. To the vigorously stirred suspension was added dropwise a solution of 0.02 mol of isophthaloyl chloride (ICL) in 10 ml of CHCl$_3$. The reaction mixture was cooled with an ice bath to maintain the temperature at 25° C. When addition of the ICL was complete, the addition funnel was rinsed with 5 ml of CHCl$_3$, which was then added to the reaction flask. At this point the reaction mixture normally had appreciable viscosity, and was allowed to stir at room temperature for 0.5 hour, heating briefly at reflux (15 min.), and then either stirred overnight or worked up immediately if the solution was very viscous. In some instances the extended reaction period seemed to increase the viscosity of the solution.

The polymer was diluted to a volume of 125 ml with CHCl$_3$ and filtered through a coarse-fritted funnel to remove most of the CaO. The slightly cloudy filtrate was transferred to a separatory funnel and extracted with dilute HCl, washed with water, dried (MgSO$_4$) and concentrated to 100 ml. At this point the CHCl$_3$ solution was quite viscous and colorless. White, fibrous polymer was then obtained by precipitation when the solution was poured slowly into either petroleum ether or hexane in a blender. The polymer was filtered, washed with petroleum ether, air dried, and then dried in vacuo at 100° C. overnight.

The above specific examples are considered illustrative of the invention and there may be modifications and variations therein that will be apparent to those skilled in the art without departing from the spirit and scope of the invention as set forth herein.

What is claimed as new and desired to be secured by Letters Patent of the United States is:

1. A solvent stable thermosetting thermoplastic polyamide having improved heat distortion temperature characteristics and comprising repeating units of the formula:

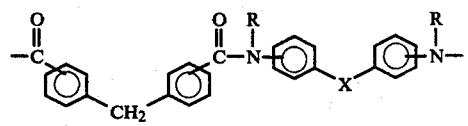

wherein X represents a covalent bond or X represents

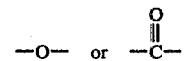

and wherein R represents a mixture of —CH$_3$ and —CH$_2$—C≡CH in varying percentages.

2. A process for preparing the polyamide of claim 1 comprising: reacting (1) a diacid chloride of the formula:

where Ar is:

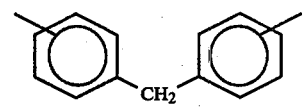

with (2) a bis-secondary diamine of the general formula:

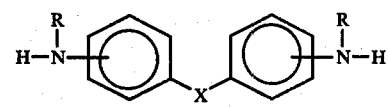

wherein X represents a covalent bond or X represents

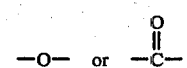

and wherein R represents a mixture of —CH$_3$ and —CH$_2$—C≡CH in varying percentages.

3. A solvent stable thermosetting thermoplastic polyamide having improved heat distortion temperature characteristics and comparing repeating units of the formula:

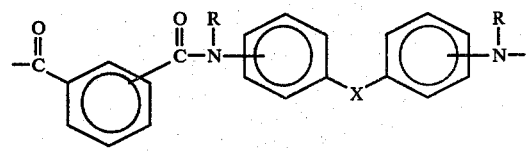

wherein X represents a covalent bond or X represents

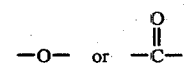

and wherein R represents a mixture of —CH$_3$ and —CH$_2$—C≡CH in varying percentages.

4. A process for preparing the polyamide of claim 3 comprising: reacting (1) a diacid chloride of the formula:

where Ar is:

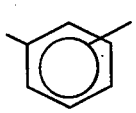
with (2) a bis-secondary diamine of the general formula:
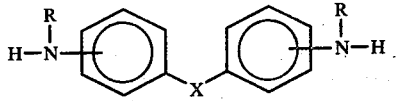
wherein X represents a covalent bond or X represents
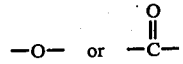
and wherein R represents a mixture of —CH$_3$ and —CH$_2$—C≡CH in varying percentages.
* * * * *